US006628675B1

(12) United States Patent
Neufeld

(10) Patent No.: US 6,628,675 B1
(45) Date of Patent: Sep. 30, 2003

(54) SYMBOL COMBINER SYNCHRONIZATION AFTER A JUMP TO A NEW TIME ALIGNMENT

(75) Inventor: Arthur Neufeld, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/540,302

(22) Filed: Mar. 31, 2000

(51) Int. Cl.[7] .................................................. H04J 3/06
(52) U.S. Cl. ........................ 370/503; 370/311; 370/280
(58) Field of Search ................................. 370/280, 311, 370/503; 375/136

(56) References Cited

U.S. PATENT DOCUMENTS

| | | |
|---|---|---|
| 5,392,287 A | 2/1995 | Tiedemann, Jr. et al. ... 370/331 |
| 5,915,216 A | 6/1999 | Lysejko ........................ 455/422 |
| 6,016,312 A * | 1/2000 | Storm et al. ................. 370/311 |

* cited by examiner

*Primary Examiner*—Hassan Kizou
*Assistant Examiner*—John Pezzlo
(74) *Attorney, Agent, or Firm*—Philip Wadsworth; Charles Brown; Donald Kordich

(57) ABSTRACT

A method and apparatus whereby a remote unit in a slotted mode wireless communication system may calculate accurate time throughout its entire active state. In the remote unit a "wall clock time" is calculated from a modulo 80 counter called a combiner time counter. When a remote unit enters its inactive state, counters within the remote unit, including the combined time counter, are deactivated. When the remote unit reenters its active state, the value in the combiner time counter may not be correct in relationship to slotted mode time. A controller in the remote unit forces the combiner time counted to the correct phase resulting in the combiner being within 26.66 of the correct value. The controller then determines a combiner offset to compensate for any remaining error in the combiner time counter. The control may then use the combiner time counter and the combiner offset to calculate accurate wall clock time. When convenient, such as at a slot boundary, the remote unit may reset the combiner counter to a correct value, and set combiner offset to zero.

19 Claims, 7 Drawing Sheets

SYMBOL COMBINER SYNCHRONIZATION AFTER A JUMP TO A NEW TIME ALIGNMENT

RELATED APPLICATIONS

The following U.S. Patent Application filed concurrently herewith, is related to this application and is hereby incorporated by reference in its entirety: SLOTTED MODE DECODER STATE METRIC INITIALIAZATION, U.S. patent application Ser. No. 09/539,852, filed on Mar. 31, 2000

FIELD OF THE INVENTION

The invention relates to wireless communications systems. In particular, the invention relates to reducing the power consumption in a remote unit in a wireless communication system utilizing slotted paging.

BACKGROUND OF THE INVENTION

A wireless communication system may comprise multiple remote units and multiple base stations. FIG. 1 exemplifies an embodiment of a terrestrial wireless communication system with three remote units 10A, 10B and 10C and two base stations 12. In FIG. 1, the three remote units are shown as a mobile telephone unit installed in a car 10A, a portable computer remote 10B, and a fixed location unit 10C such as might be found in a wireless local loop or meter reading system. Remote units may be any type of communication unit such as, for example, hand-held personal communication system units, portable data units such as a personal data assistant, or fixed location data units such as meter reading equipment. FIG. 1 shows a forward link 14 from the base station 12 to the remote units 10 and a reverse link 16 from the remote units 10 to the base stations 12.

Communication between remote units and base stations, over the wireless channel, can be accomplished using one of a variety of multiple access techniques which facilitate a large number of users in a limited frequency spectrum. These multiple access techniques include time division multiple access (TDMA), frequency division multiple access (FDMA), and code division multiple access (CDMA). An industry standard for CDMA is set forth in the TIA/EIA Interim Standard entitled "Remote unit-Base Station Compatibility Standard for Dual-Mode Wideband Spread Spectrum Cellular System", TIA/EIAJIS-95, and its progeny (collectively referred to here as IS-95), the contents of which are incorporated by reference herein in their entirety. Additional information concerning a CDMA communication system is disclosed in U.S. Pat. No. 4,901,307, entitled SPREAD SPECTRUM MULTIPLE ACCESS COMMUNICATION SYSTEM USING SATELLITE OR TERRESTRIAL REPEATERS, (the '307 patent) assigned to the assignee of the present invention and incorporated in its entirety herein by reference.

In the '307 patent, a multiple access technique is disclosed where a large number of mobile telephone system users, each having a transceiver, communicate through base stations using CDMA spread spectrum communication signals. The CDMA modulation techniques disclosed in the '307 patent offer many advantages over other modulation techniques used in wireless communication systems such as TDMA and FDMA. For example, CDMA permits the frequency spectrum to be reused multiple times, thereby permitting an increase in system user capacity. Additionally, use of CDMA techniques permits the special problems of the terrestrial channel to be overcome by mitigation of the adverse effects of multipath, e.g. fading, while also exploiting the advantages thereof.

In a typical CDMA communication system, remote units only sporadically establish bi-directional communication with a base station. For example, a cellular telephone remains idle for significant periods of time when no call is in process. To ensure that any message directed to a remote unit is received, the remote unit must continuously monitor the communication channel even while it is idle. For example, while idle, the remote unit monitors the forward link channel from the base station to detect incoming calls. During such idle periods, the cellular telephone continues to consume power to sustain the elements necessary to monitor for signals from the base stations. Many remote units are portable and are powered by an internal battery. For example, personal communication system (PCS) handsets are almost exclusively battery-powered. The consumption of battery resources by the remote unit in idle mode decreases the battery resources available to the remote unit when a call is placed or received. Therefore, it is desirable to minimize power consumption in a remote unit in the idle state and thereby increase battery life.

One means of reducing remote unit power consumption in a communication system is disclosed in U.S. Pat. No. 5,392,287, entitled APPARATUS AND METHOD FOR REDUCING POWER CONSUMPTION IN A MOBILE COMMUNICATION RECEIVER (the '287 patent), assigned to the assignee of the present invention and hereby incorporated in its entirety herein by reference. In the '287 patent, a technique for reducing power consumption in a remote unit operating in an idle mode (i.e. a remote unit which is not engaged in bi-directional communication with a base station) is disclosed. In idle, each remote unit periodically enters an "active"state during which it prepares to and receives messages on a forward link communication channel. In the time period between successive active states, the remote unit enters an "inactive" state. During the remote unit's inactive state, the base station does not send any messages to that remote unit, although it may send messages to other remote units in the system that are in the active state.

As disclosed in the '287 patent, a base station broadcast messages which are received by all remote units within the base station coverage area on a "paging channel." All idle remote units within the base station coverage area monitor the paging channel. The paging channel is divided in the time dimension into a continuous stream of "slots." Each remote unit operating in slotted mode monitors only specific slots which have been assigned to it as active (assigned) slots. The paging channel continually transmits convolutional encoded messages in numbered slots, repeating the slot sequence, such as for example, every 640 slots. When a remote unit enters the coverage area of a base station, or if a remote unit is initially powered on, it communicates its presence to a preferred base station. Typically the preferred base station is the base station which has the strongest pilot signal as measured by the remote unit.

The preferred base station, along with a plurality of geographically near neighboring base stations, assign a slot, or a plurality of slots, within their respective paging channels, for the remote unit to monitor. The base station uses the slots in the paging channel to transmit control information to a remote unit, if necessary. The remote unit may also monitor a timing signal from the preferred base station allowing the remote unit to align, in the time dimension, to the base station slot timing. By aligning in the time dimension to the preferred base station slot timing, the remote unit can determine when a paging channel slot sequence begins. Thus, knowing when the paging channel slot sequence begins, which slots are assigned for it to monitor, the total number of slots in the repetitive paging channel sequence of slots, and the period of each slot, the remote unit is able to determine when its assigned slots occur.

Generally, the remote unit is in the inactive state while the base station is transmitting on the paging channel in slots which are not within the remote unit's assigned set. While in the inactive state, the remote unit does not monitor timing signals transmitted by the base station, maintaining slot timing using an internal clock source. Additionally, while in the inactive state the remote unit may remove power and/or clocks from selected circuitry, such as, for example, circuits which monitor the wireless channel and the decoder. Using its internal timing, the remote unit transits to its active state a short period of time before the next occurrence of an assigned slot.

In order for a message to be decoded with high reliability by the remote unit, the active state must include the time needed to reinitialize the receiver chain to provide valid receive samples, the time needed to search these samples for multipath and assign demodulation fingers to provide a valid symbol stream, and the time needed to initialize the state metrics with the symbol stream before the symbols associated with the message of interest. During the initialization of the analog receiver chain, the frequency synthesizer used to mix the received signal down to baseband frequency must come into lock, and gain scaling and DC bias loops, if any, must lock to provide a valid baseband receive sample stream. In a communication system based on IS-95, the paging channel is continuously encoded with a K=9, rate ½ convolutional code. Several constraint lengths of symbols must be provided to the Viterbi decoder to initialize its state metric values in advance of the symbols of interest.

To demodulate the paging channel, the remote unit needs to acquire a precise timing reference for each of the multipath instances that comprise the received waveform. Demodulator fingers, each with their own specific time reference, are assigned to the individual multipath instances. Each, finger despreads, the receive samples at its assigned time reference. The despread results from each finger are then combined to form a single symbol stream for decoding. Such a demodulator, known as a RAKE receiver, is described in U.S. Pat. No. 5,109,390 entitled "DIVERSITY RECEIVER IN A CDMA CELLULAR TELEPHONE SYSTEM", issued Apr. 28, 1992, assigned to the assignee of the present invention and incorporated herein by reference.

During initial power-on acquisition, all possible shifts of the PN sequences are searched to acquire the timing references for each finger. Searching each PN offset can take anywhere from hundreds of milliseconds to a few seconds depending on the channel conditions during acquisition. Performing such a full reacquisition at the start of every active state would take too long and consume too much current for a practically sized portable battery. Instead, the clock to the demodulator circuit is gated off for a precise duration of time which is designed so that the circuits are automatically aligned with the system when their clocks are gated back on. The time period is measured by a sleep timer clocked off a high precision oscillator. During the sleep interval, only the oscillator and the sleep timer are active.

In IS-95 systems, an interleaver in the transmitter and a deinterleaver in the remote unit process data on 20 ms frame boundaries. Both must be aligned with each other. PN generators in the transmitter and the remote unit have sequence lengths of $2^{15}$. Each PN generator updates at a rate of 1.2288 MHz, therefore the PN sequence period is 26.66 ms. PN generators in the remote unit must align with respective PN generators in the transmitter. The smallest period that is common to both the interleaver/deinterleaver timing and the PN sequence timing is 80 ms. Exactly 3 PN sequence periods of 26.66 ms and exactly 4 interleaver frames of 20 ms fit into an 80 ms period. More generally, the sleep interval is programmed in steps of the least common multiple of the two intervals.

The sleep timer in the remote unit is programmed to sleep for a multiple of the 80 ms period to ensure that both the timing reference of the fingers and the frame reference timing of the deinterleaver do not change with respect to actual time, or "wall clock" time, i.e., the timing of the preferred base station. If the sleep timer is programmed with a value other than a multiple of 80 ms, when the demodulator activates the PN generators and/or the interleaver timing will not be aligned with the proper system time and demodulation will be impossible.

To prolong battery life, it would be desirable to decrease the amount of time the remote unit is in its active state. However, the remote unit must be in its active state long enough, prior to the beginning of a message directed to it, to ensure that both the timing reference of the demodulation fingers and the frame reference timing of the deinterleaver are properly aligned. Therefore, there is a need in the art for a method and apparatus to decrease the time required by a remote unit to prepare for the receipt of messages during its assigned time slot.

SUMMARY OF THE INVENTION

The invention addresses these and other needs by providing a system and method wherein a method and apparatus which provide synchronization after a jump to a new time alignment. This allows, for example, a remote unit to enter an active state at a later time while still maintaining an accurate time sense.

In one aspect of the invention, a method is provided for use in a remote unit which operates in a slotted mode communication system. The method includes entering an active state from an inactive state after a predetermined time period. The combiner time counter and at least one demodulation finger are reactivated. An 80 ms counter is adjusted to a desired count. The combiner time counter is adjusted to the proper phase. Wall clock time is determined with reference to a combiner offset value, the 80 ms counter, and the combiner time counter.

In another aspect of the invention, a remote unit is provided which can provide synchronization after a jump to a new time alignment. The remote unit includes a demodulation finger, a combiner time counter, an 80 ms counter and a controller. The controller is configured to update the 80 ms to a desired count upon entering an active state after a predetermined period in an inactive state. The controller is further configured to force the combiner counter to the proper phase upon entering the active state. The combiner is also configured to calculate a time measurement with reference to the 80 ms counter in the correction factor.

BRIEF DESCRIPTION OF THE DRAWINGS

The features, objects and advantages of aspects of the present invention will become more apparent from the detailed description set forth below when taken in conjunction with the drawings in which like references characters identify correspondingly throughout, and wherein.

DETAILED DESCRIPTION OF THE INVENTION

Figure 1:
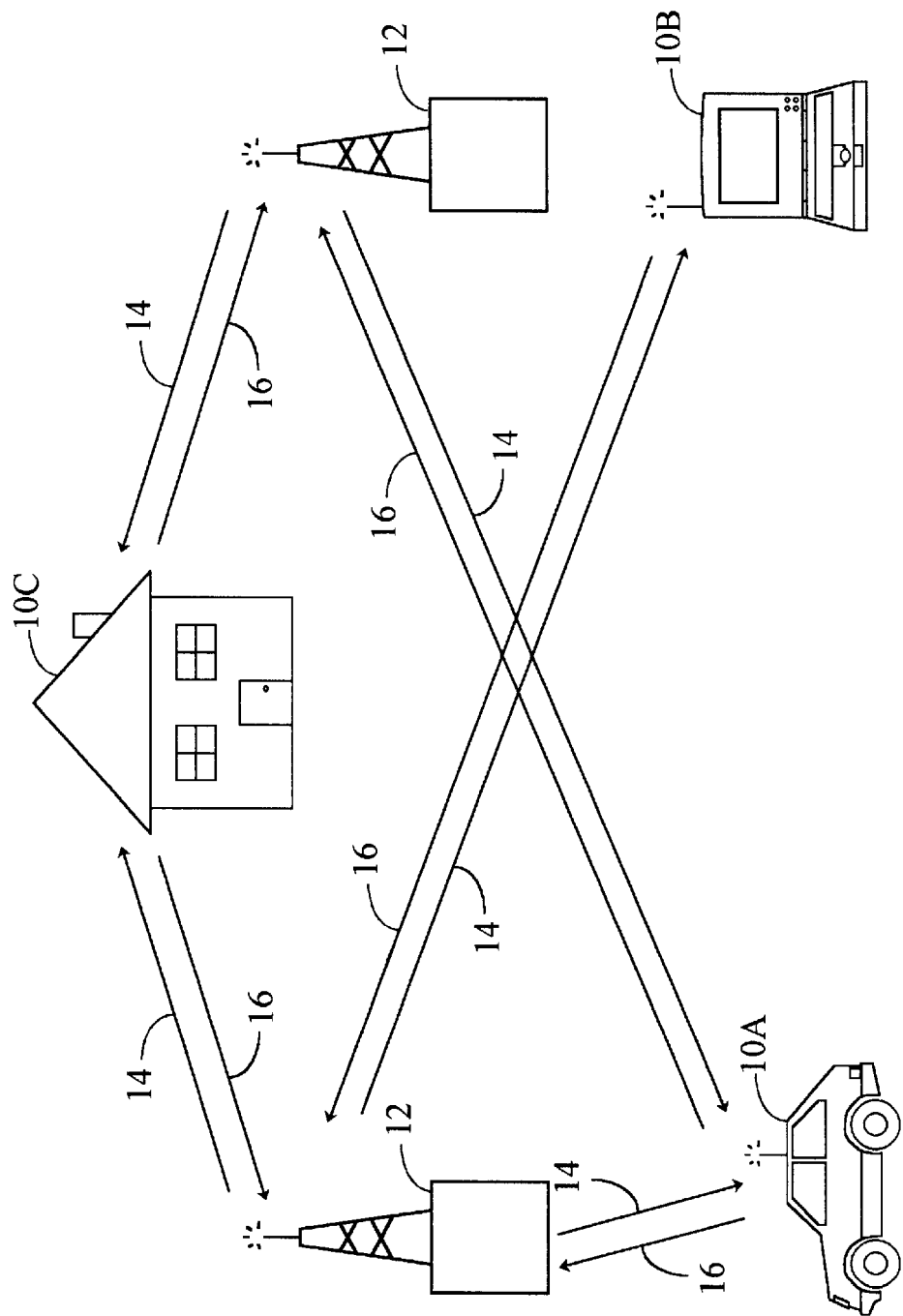
FIG. 1 is a representative diagram showing a typical modem wireless communication system.
Figure 2:
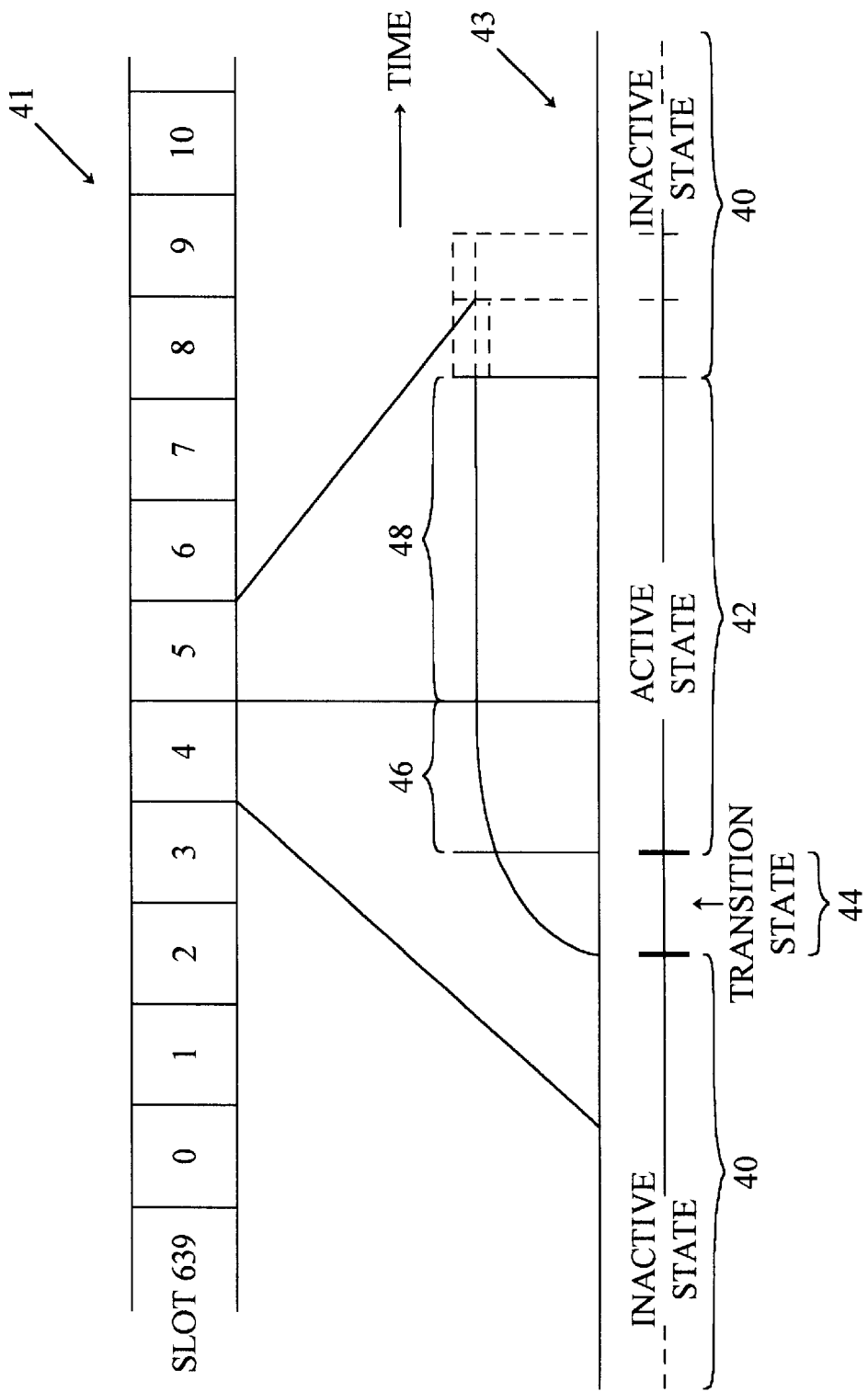
FIG. 2 is a representative diagram illustrating the transition from an inactive state to an active state at an assigned slot of a remote unit in a slotted mode communication system.

FIG. 2 is a representative diagram illustrating the transition from the inactive state to the active state at the assigned slot of a remote unit in a slotted mode communication system. FIG. 2 includes two separate portions. An upper potion 41 represents a continual sequence of slots which flow in time from left to right. The lower portion 42 represents events occurring during a transition between active and inactive states of a remote unit in a slotted mode communication system in which slot 5 is an assigned slot. The time scale for the lower portion has been expanded so that the transition can be shown in more detail.

In particular, the lower portion 43 of FIG. 2 shows the transition from an inactive state 40 to an active state 42. In the active state 42, the remote unit monitors the base station signal during at least a portion of slot 5. Prior to the start of slot 5, the remote unit transits from the inactive state 40 to the active state 42 through a transition state 44. As described above, in the inactive state 40, selected circuitry in the remote unit is unpowered, reducing power consumption and extending battery life of the remote unit. For example, power may be removed from the search engine during the inactive state 40.

During the transition state 44, power is reapplied to the selected circuitry of the remote unit. For example, if the search engine is unpowered, power is reapplied in the transition state 44. The duration of the transition state 44 is sufficient to allow the remote unit to power on circuits and initialize functions so that the remote unit is functional, allowing it to perform searches at the end of the transition state 44.

Following the transition state 44, the remote unit enters the active state 42. The active state 42 is made up of two parts: a preparation period 46 and an assigned slot period 48. During the preparation period 46, an initial search is performed reacquiring the pilot signal of the preferred base station so that the remote unit is prepared to monitor the paging channel during the assigned slot period 48. The assigned slot period 48 begins at the beginning of slot 5.

During the assigned slot period 48, the remote unit receives messages on the paging channel from the preferred base station. Normally, at the completion of slot 5, the assigned slot period 48 and the active state 42 terminate and the remote unit enters the inactive state 40. In order to further reduce the power consumption of the remote unit, the base station may command the remote unit to enter the inactive state 40 before the completion of slot 5. Alternatively, if the base station cannot complete the transfer of messages during slot 5, the base station may command the remote unit to remain in the assigned slot period 48 after the completion of the slot 5. Subsequently, the base station commands the remote unit to enter the inactive state 40. Searching terminates upon entering the inactive state 40 and power can be removed from the search engine.

As discussed above, in slotted paging operation, the remote unit remains inactive during its non-assigned slots, and enters its active state promptly before its assigned slot as described above with reference to the incorporated U.S. Pat. No. 5,392,287. The remote unit remains inactive for a programmed number of time periods. The remote unit must become active at least before the assigned slot in order to prepare to demodulate the paging channel.

One embodiment of a remote unit operating in a slotted mode communication system is based on the IS-95 standard. As discussed above, in IS-95, the PN spreading sequence repeats every $2^{15}$ chips with a chip rate of 1.2288 MHz. Thus the PN sequence period is 26.66 ms. The deinterleaver frame spans 20 ms. Therefore, 80 ms is the least common multiple of both the 20 ms channel frames and the 26.66 ms PN sequence repetitions. The slot cycle duration is a multiple of 80 ms, typically 1.23, 2.56, or 5.12 seconds. IS-95 uses a continuous convolutional code. For a convolutional decoder, such as a Viterbi decoder, to reliably decode a continuous convolutional code, such as that used on the IS-95 paging channel, requires approximately 18 to 20 ms worth of valid symbols prior to the beginning of the message to be decoded. The symbol is received ahead of the message to initialize the state metrics of the decoder, ensuring proper decoding of the message. Therefore, in a system based on IS-95, the remote unit must enter its active state at least 18 to 20 ms before its slot boundary to properly initialize the decoder.

Figure 3:
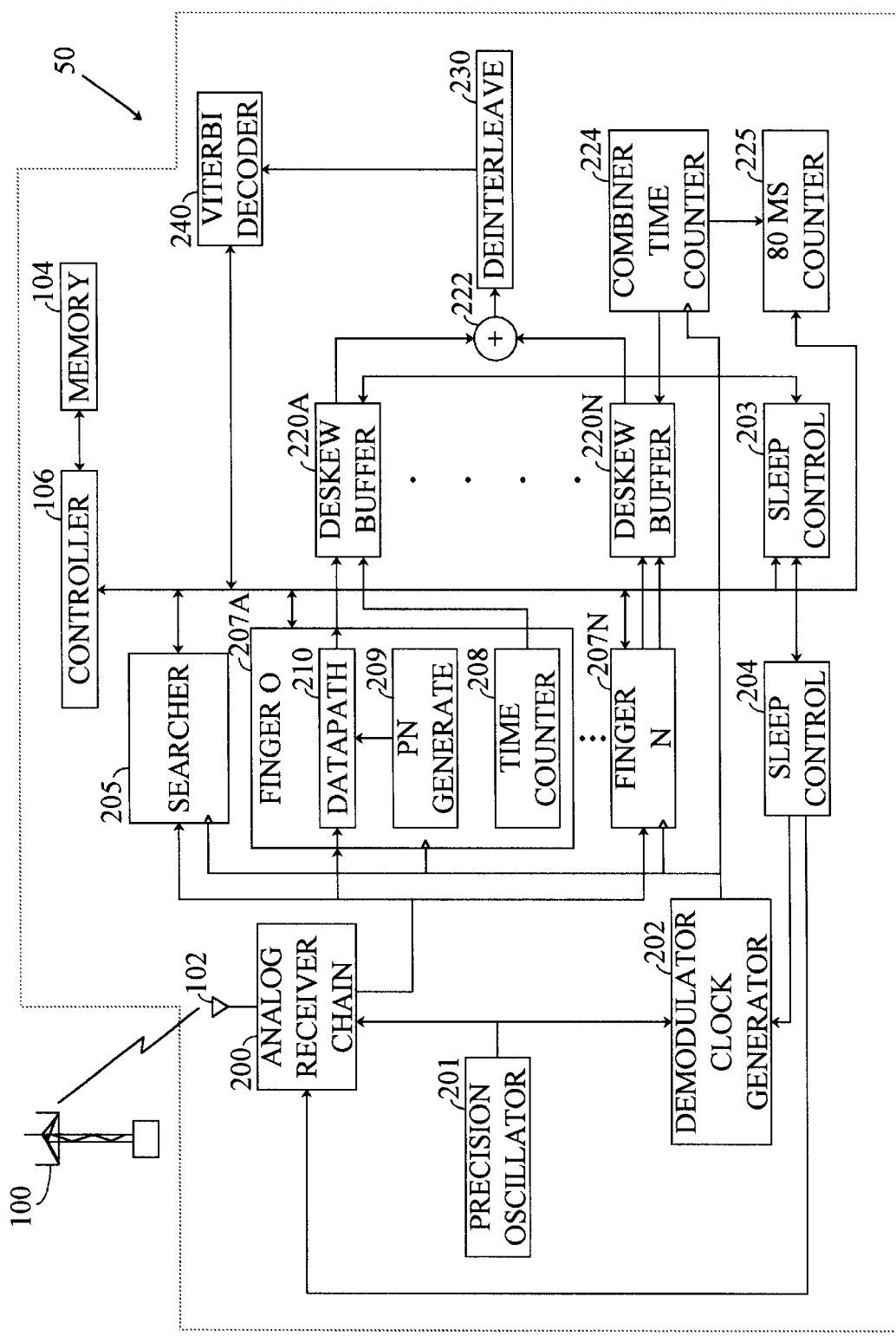
FIG. 3 is a block diagram of an embodiment of a remote unit.

FIG. 3 shows a block diagram of one embodiment of a remote unit 50A. Transmitter 100 transmits to the remote unit 50. During initial acquisition, an analog receiver chain 200 is initialized to provide valid baseband samples from the signals received on an antenna 102. A searcher 205 is programmed or directed by a controller 106 to correlate the received samples at all possible PN offsets to acquire the timing references of the multipath instances from any reflections or nearby transmitters. The controller may be a microprocessor, a field programmable gate array (FPGA), an application specific integrated circuit (ASIC), or other control logic. In one embodiment, the controller is configured by software. In other embodiments, the controller may be configured by firmware. In addition, configuration of the controller may be upgraded by downloading new software or firmware via the wireless communication channel, allowing field upgrades of the remote unit.

The controller 106 directs each of the fingers 207A–207N to adjust their timing reference to the one of the multipath instances identified by the searcher 205. This adjustment is made by either speeding up or slowing down a finger time counter 208 and a PN sequence generator 209. The finger time counter 208 and the PN sequence generator 209 increment every chip (PN bit) and reset after counting $2^{15}$ chips (one complete PN sequence). Once at the assigned timing reference, the fingers 207A–207N despread the receive samples using a PN sequence shift appropriate for their particular timing reference. The despread samples are integrated over a symbol duration (such as 64 chips) and weighted by the strength of the multipath instance being tracked via a finger datapath 210. Each of the fingers 207A–207N writes the resulting sample into the respective deskew buffers 220A–207N using its time counter 208 as the write index. Since each of the fingers 207A–207N is at a different. assigned offset, the like indexed symbols from each finger are written into the deskew buffers 220A–220N at different times.

A combiner time counter 224 is delayed from the time reference of the fingers. The combiner time counter 224 is a modulo 80 counter, incrementing every chip and resetting after counting 80 ms of chips. Using the combiner time counter 224 as the read index into each finger section of the deskew buffers 220A–220N, the like-indexed symbols from each finger are read together and are time aligned. The time aligned symbols are summed together by a combiner summer 222 and provided to the deinterleaver 230. An 80 ms counter 225, or frame counter, is in communication with the combiner time counter 224. The 80 ms counter 225 increments its count each time the combiner time counter "rolls." The 80 ms counter is also in communication with controller 106. As described below, the controller 106 can read the count value of the 80 ms counter as well as update the count value if the combiner time counter does not "roll" every 80 ms, such as, for example, when the remote unit is in its inactive state.

The deinterleaved symbols are subsequently provided to the Viterbi decoder 240 for further processing, as is well known in the art. In one embodiment, the deskew buffers 220A–220N are eight symbols deep, and the combiner time counter 224 is initialized to a state which is four symbols delayed from the finger time counter 208 of the finger tracking the earliest multipath signal.

At the end of its active state, when the remote unit 50 is preparing to enter its inactive state, the controller 106 sends a command to the sleep controller 204 to go to sleep. The controller 204 also programs the sleep counter 203 to count the duration of a sleep interval, i.e., inactive state. The sleep controller 204 then directs the remote unit 50 to enter its inactive state and starts the sleep counter 203. The sleep controller 204 sends a disable signal to the input of the demodulator clock generator 202 and sends a power down signal to the analog receiver chain 200. Using the precision oscillator 201 as a clock source, the sleep counter 203 counts down the sleep interval. During the sleep interval, with the demodulator clock 202 disabled and the analog receiver chain 200 powered down, the sleep counter 203 and the precision oscillator 201 account for all of the power consumption in the remote unit.

Prior to the expiration of the sleep counter 203, the analog receiver chain 200 is reinitialized. The time required prior to expiration is based on the warm-up time of the analog receiver chain 200, typically a few milliseconds. Upon expiration of the sleep counter 203, the demodulator clock generator 202 is reenabled and the remote unit 56 enters its active state. The searcher 205 is programmed by the controller 106 to correlate receive samples with a small group of PN offsets centered around the multipath present during the previous awake phase. The controller 106 then directs the fingers 207A–207N to adjust their timing reference to the multipath instances identified by the searcher 205, so that a valid symbol stream is provided to the deinterleaver 230 and subsequently to the Viterbi decoder 240 to allow for the paging channel message to be decoded.

The inactive state may be confined to be a multiple of 80 ms as was the slot duration to align the PN sequence and deinterleaver from interval when the remote unit reenters its active state. Thus, the soonest the remote unit could enter the inactive state was 80 ms after its slot boundary, and the latest it could enter the active state was 80 ms before the slot boundary. Therefore, the minimum active state was 160 ms in duration.

If the inactive interval is not a multiple of the PN sequence period, then when the demodulator circuit is reenabled its finger timing is grossly misaligned relative to the PN sequence used to spread the received signal at the transmitter. If the inactive interval isn't a multiple of the deinterleaver frame interval, when the demodulator circuit is reenabled its deinterleaver start-of-frame reference is grossly misaligned relative to the actual interleaver framing used at the transmitter. A technique allowing the fingers, the combiner, and the sleep timers to be configure to allow proper decoding of the paging message even if the inactive interval is not an integral multiple of either the PN sequence period of the deinterleaver frame interval is disclosed in U.S. application Ser. No. 09/118,750, filed Jul. 17, 1998 entitled TECHNIQUE FOR REDUCTION OF AWAKE TIME IN A WIRELESS COMMUNICATION DEVICE UTILIZING SLOTTED PAGING [[Qualcomm Reference No. PA '582 app]].

Figure 4:
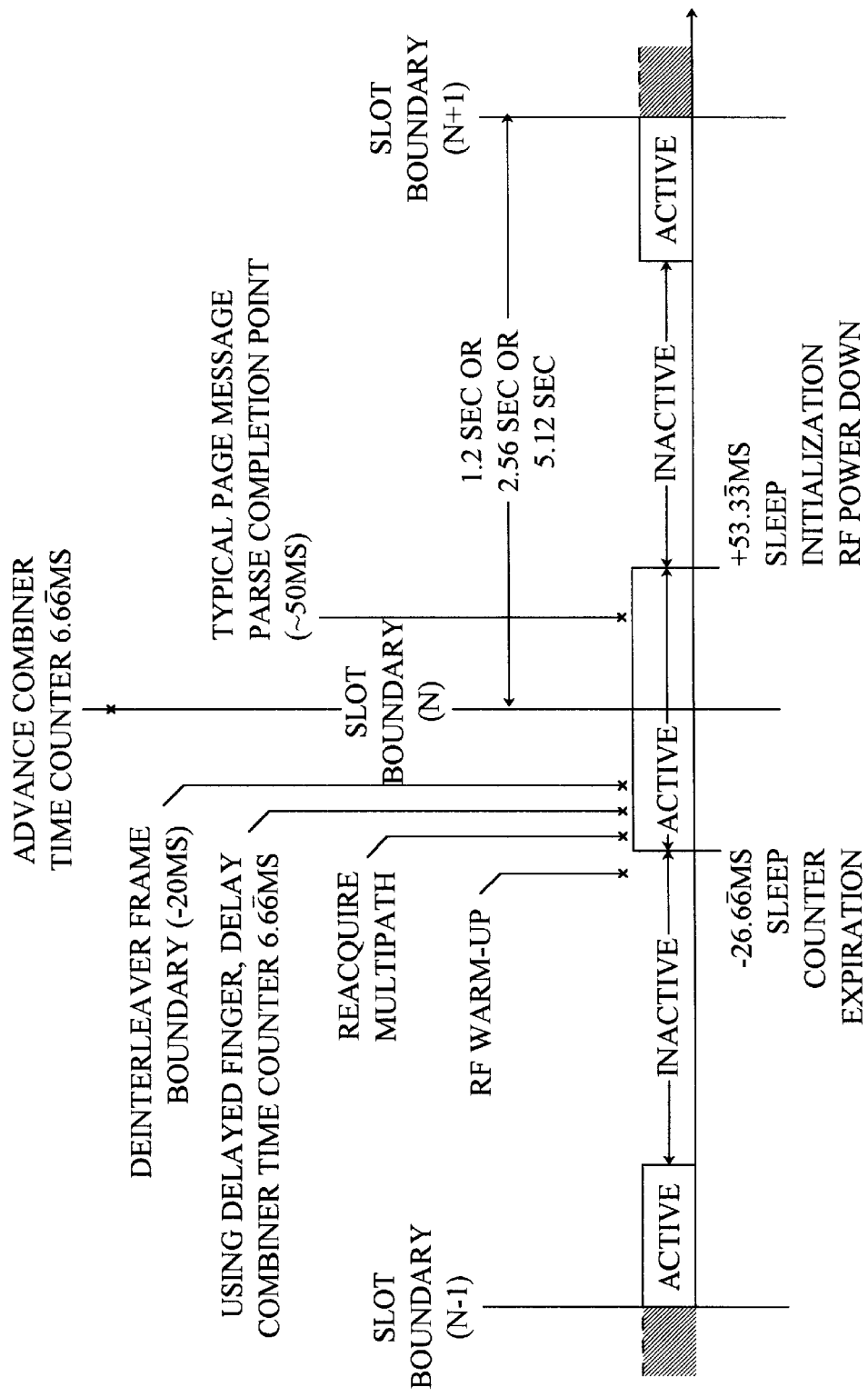
FIG. 4 is a representative diagram illustrating a timeline of the remote unit transition between active and inactive states.

FIG. 4 shows a typical timeline utilizing the techniques disclosed in U.S. Patent application Ser. No. 09/118,750, filed Jul. 17, 1998 entitled TECHNIQUE FOR REDUCTION OF AWAKE TIME IN A WIRELESS COMMUNICATION DEVICE UTILIZING SLOTTED PAGING [[Qualcomm Reference No. PA '582 app]]. The cycle begins at Slot Boundary (n–1) in the active state. Rather than going inactive on the 80 ms following Slot Boundary (n–1), the sleep controller disables the demodulator clock on the first 26.66 ms following the parsing of any page messages directed at the remote unit. The active interval is programmed to be the slot intervals minus the active interval, so that the modulator sleeps until it is reenabled 26.66 ms before Slot Boundary (n).

When the demodulator clock is reenabled 26.66 ms before slot boundary (n), the deinterleaver frame reference as derived by the combiner time counter, may not have the proper frame alignment needed to demodulate the paging channel (when it does have the proper timing, it is merely a matter of chance). To generate the proper frame alignment, one finger of the fingers is directed by the controller to delay its time reference exactly 6.66 ms from the other fingers, the difference between a PN sequence period and a deinterleaver frame interval. This finger is not used in demodulation, but is used only to initialize the combiner time counter with a delayed timing reference. Typically, the combiner time counter is reinitialized to a nominal depth of 4 symbols from this delayed finger, so that instead of the combiner time counter resetting at the slot boundary, it resets exactly 20 ms, or 1 frame before the Slot Boundary (n). Despite the fact that the combiner time reference is misaligned relative to a proper slot boundary alignment, it is aligned with a 20 ms deinterleaver symbol frame boundary. Therefore, symbol frames may be deinterleaved properly.

With the proper deinterleaver alignment 20 ms before the slot boundary, the symbols in the frame prior to the slot boundary can be presented to the decoder in the correct deinterleaved order so the state metrics can be initialized. The decoder decodes the symbol stream and presents the results to the controller. If no pages requiring a response are received, the controller directs the sleep controller to put the remote unit to sleep on the next combiner 26.66 ms boundary. In one embodiment, this determination can often be made for an idle paging channel after the first frame of decoded data, in which case the sleep controller commands the remote unit to the inactive state on the first 26.66 ms boundary following the slot boundary, resulting in an active interval of 53.33 ms. Otherwise the controller usually directs the sleep controller to command the remote unit to the inactive state on the second 26.66 ms boundary following the slot boundary, resulting in an awake interval of 80 ms. In either case, the awake interval of FIG. 4 is substantially less than the 160 ms active interval of previous systems.

Because the deinterleaver initialization does not depend on going into the inactive state at any particular point in time, gains can be realized on both the leading edge of the active interval in which the timeline is shortened from 80 ms to 26.66 ms; and also on the trailing edge, where the demodulator can be gated off as early as the messaging allows it to be without special consideration for the deinterleaver frame alignment.

At some point before the remote unit begins transmitting on the reverse link in response to a received message, the combiner time reference needs to be realigned to the nominal 4 symbol delay from the earliest arriving multipath used in demodulation. This can be done at the slot boundary, or sometime later to allow additional time to parse the first paging channel message following the slot boundary. If the combiner time counter is still on the delayed time reference and the controller directs the sleep controller to command the remote unit to enter its inactive state on the combiner's first 26.66. ms time boundary, the remote unit will power down 33.33 ms after the slot boundary. Rather than remain inactive, a multiple of 26.66 ms, the sleep counter will be programmed for a multiple of 26.66 ms less 6.66 ms so that the demodulator clock is again reenabled 26.66 ms before the next slot boundary.

Several functions within the remote unit require accurate timing in relation to the preferred base station timing, referred to as "wall clock time" to function properly. Within the remote unit "wall clock time" is maintained by counting the number of times the combiner time counter counts an 80 ms period. The combiner time counter, as described above is a modulo 80 counter, which repeatedly counts from 0 through 80. While the remote unit is in its active state the 80 ms counter is incremented every time the combiner time counter reaches 80, or "rolls." The controller in the remote unit is then able to calculate "wall clock time" by multiplying the value of the 80 ms counter by 80 ms and adding the current value of the combiner time counter.

When the remote unit enters its inactive state the combiner time counter is deactivated. The remote unit remains in its inactive state for a precise duration, as controlled by the sleep counter. When the remote unit reenters its active state the 80 ms counter is incorrect, having not been updated during the inactive state. The remote unit controller, knowing the duration of the inactive state updates the 80 ms counter to the correct count. However, the combiner time counter may not have the correct count because the counter was stopped when the remote unit went inactive. Therefore, unless the combiner time counter was stopped at the same time relative to the slot time, as when it was started, the count value will be in error.

During the period after the remote unit enters its active state until the slot boundary the remote unit may not be able to calculate accurate "wall clock time." When the remote unit reaches the slot boundary, the combiner time counter will be forced to "roll" and accurate "wall clock time" can then be calculated.

Figure 5:
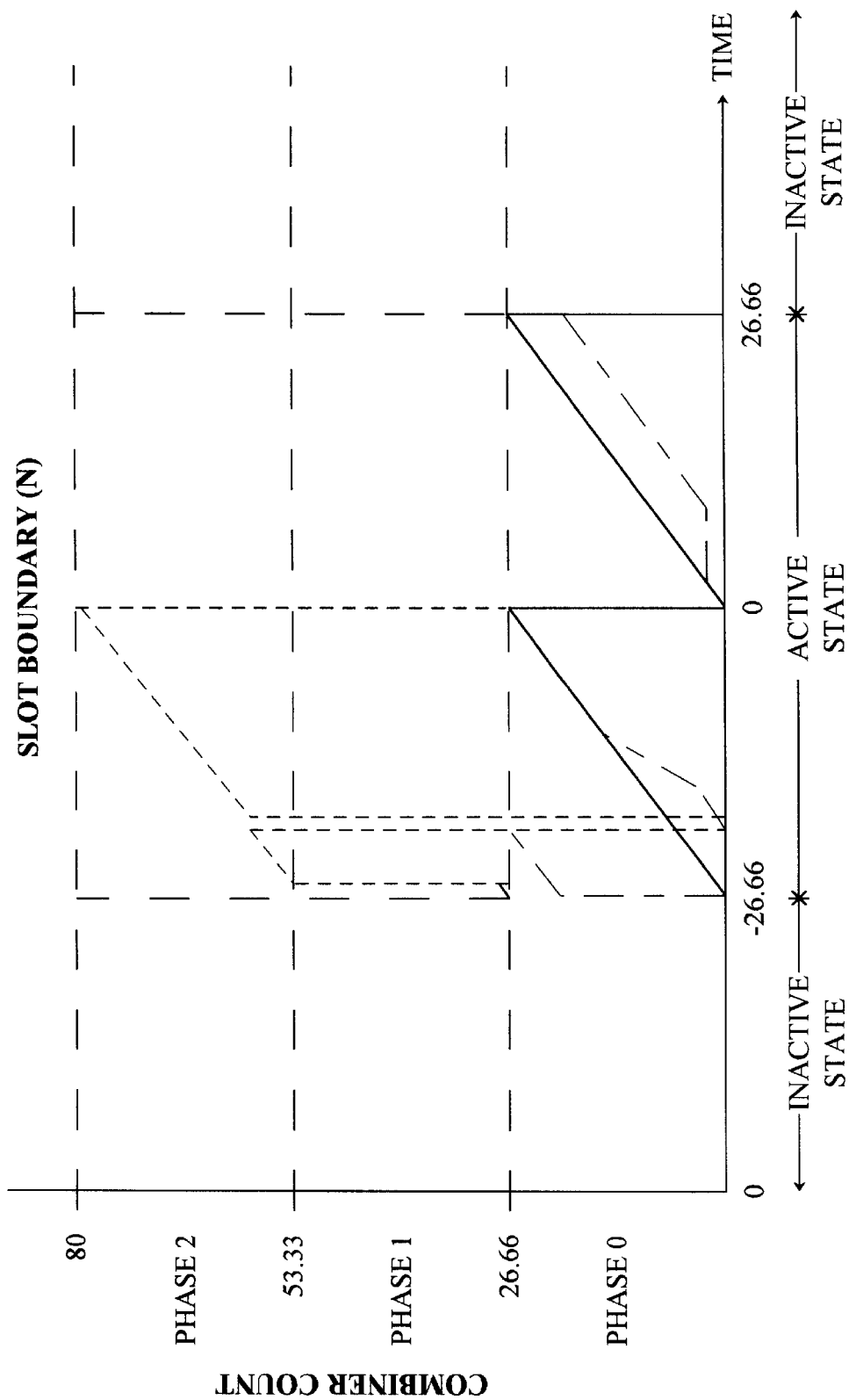
FIG. 5 is a representative diagram illustrating the combiner time counter value as a remote unit transits from an inactive to an active state at the assigned slot of the FIG. 6 is a flow chart of a method for adjusting counters as a remote unit transitions from an inactive state to a slot boundary.

FIG. 5 is a diagram illustrating the combiner time counter value during the remote unit transition between active and inactive states according to aspects of the present invention. In FIG. 5, the horizontal axis is time. The vertical axis is combiner count. Combiner count is divided into three regions, or phases. Phase 0 represents when the combiner count is between 0 and 26.66, phase 1 represents combiner count from 26.66 to 53.33, and phase 2 represents combiner count from 53.33 to 80.

In the example shown in FIG. 5, the remote unit enters its inactive state at 26.66 ms, corresponding to a combiner time counter roll. Because the remote unit enters its inactive state on a combiner time counter roll, the counter has a value of 0. The demodulation fingers are 26.66 plus the four symbol periods the demodulation fingers are advanced ahead of the combiner time counter as described above. The delayed finger, which has been offset from the demodulation fingers by 6.66 ms, has a value of 20.

The remote unit remains in its inactive state for a precise time, as controlled by the sleep counter, reentering its active state 26.66 ms before the slot boundary. In FIG. 5, the remote unit reenters its active state at −26.66 ms. Because the clocks to the demodulation fingers, delayed finger and combiner time counter, were deactivated while the remote unit was in its inactive state, their values have not changed since the remote unit entered its active state. By reentering its active state precisely 26.66 ms before the slot boundary, one PN roll, the demodulation finger time is synchronized with the paging channel timing. The delayed finger will "roll" 6.66 ms after the remote unit enters its active state, 20 ms before the slot boundary corresponding to the frame boundary. However, the combiner count may be incorrect.

In the example, the proper value of the combiner time counter relative to the slot boundary would be 53.33. Instead, the combiner time counter has a value of 26. If the remote unit did not enter its inactive state on the first PN roll after slot boundary (n), the combiner time count may contain a different value. However, it is only by chance if it is the correct value because the remote unit enters its inactive state without regard to the combiner time count value. In addition, while the remote unit was inactive, the combiner time counter was deactivated. Thus, the combiner time counter did not "roll," so the 80 ms counter is also incorrect. When the remote unit enters it active state, the controller determines how many 80 ms periods the remote unit had been inactive. The controller then updates the value of the 80 ms counter to the correct value. Therefore, the remote unit has the correct "wall clock time" within 80 ms. To determine the actual "wall clock time," the remote unit must synchronize itself to the preferred base station time. This is accomplished using the combiner time counter which tracks the timing of the multipath signal received from the preferred base station. However, the remote unit is not able to calculate accurate "wall clock time."

The controller corrects the combination time counter value by forcing the combiner time counter into phase 2 and determining a combiner "offset." For example, as illustrated in FIG. 5, after the remote unit enters its active state, the controller forces the combiner to transit from phase 1 to phase 2. The combiner time counter then contains the correct value corresponding to a time 26.66 ms before the slot boundary. Because the combiner time counter is correct, the combiner offset value is set to zero. The controller can force the combiner time counter into a particular phase by, for example, manipulating the two most significant bits of the counter values.

The combiner time counter increments its count for 6.67 ms, until 20 ms before the slot boundary, when the delayed finger "rolls." The combiner time counter determines the delay finger rolled 20 ms before the slot boundary, and resets to 0 as described above. The combiner time counter is now aligned with the beginning of a 20 ms frame allowing proper deinterleaving of received symbols. Knowing that the combiner timer has been reset to phase 0, the controller forces the combiner time counter back into phase 2. Because the controller only controls which phase the combiner timer is in, not its entire contents, the combiner timer is now 6.66 ms less than the correct value. Therefore, the controller sets the combiner offset to 6.66.

The combiner time counter continues to increment until the slot boundary (n) is reached. During this period, the controller maintains a combiner offset value, or correction factor, of 6.66. When "wall clock time" is calculated during this period the correction factor is summed with the combiner time counter providing an accurate combiner time count value.

At the slot boundary, the demodulation fingers and delay finger roll. Because the combiner time counter tracks the delay finger, the combiner time counter is "slammed" to 0. After the slot boundary, the combiner time counter begins tracking the demodulation finger assigned to the earliest arriving multipath instant of the preferred base station. This aligns the remote unit timing properly for reception of messages in its assigned slot.

Following the slot boundary, and prior to the first PN roll, the delayed finger clock is disabled for 6.66 ms. The delayed finger clock is then enabled. The remote unit then remains in its active state until able to reenter its inactive state, at which time the above described process is repeated.

Figure 6A:
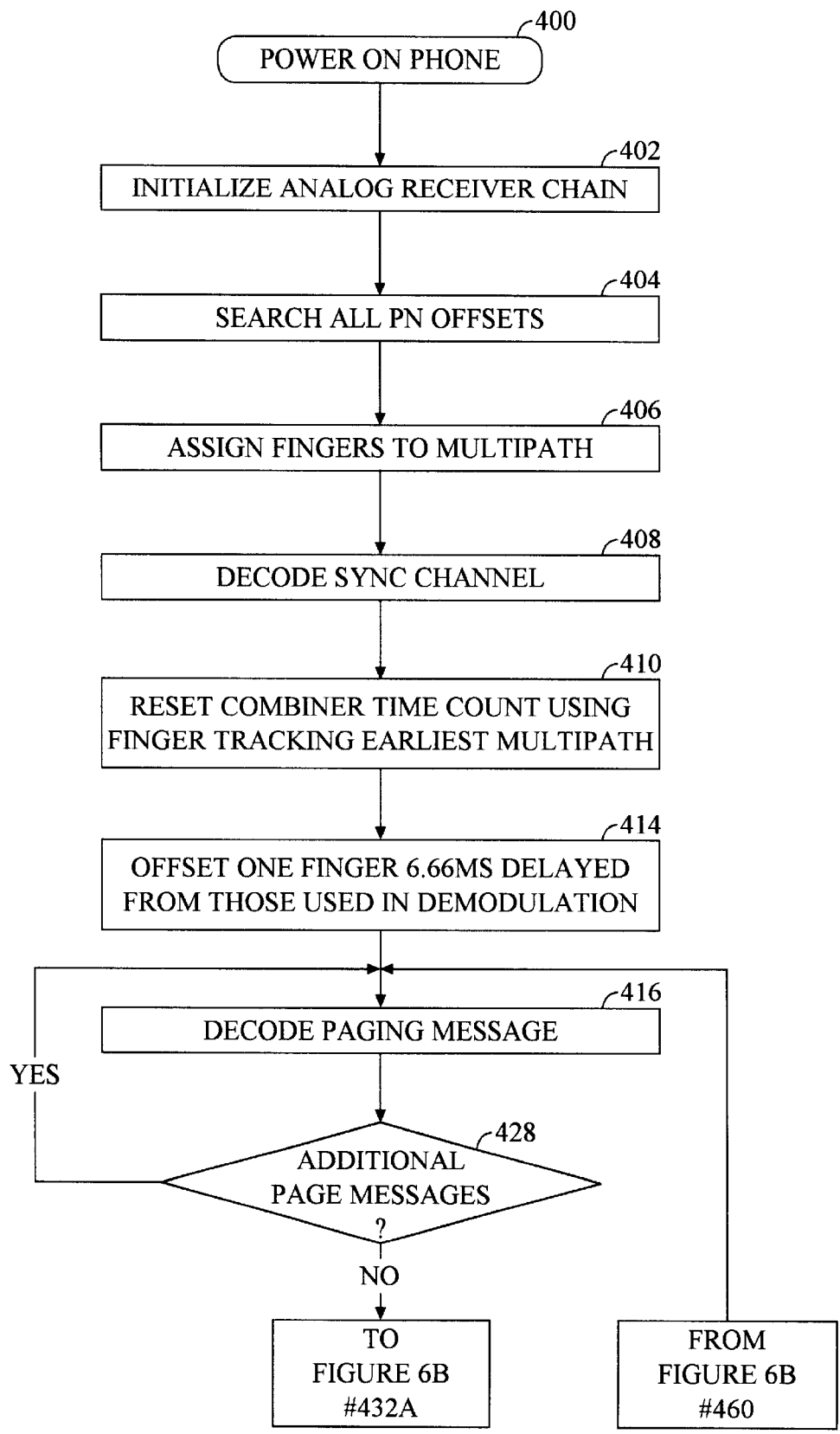
Figure 6B:
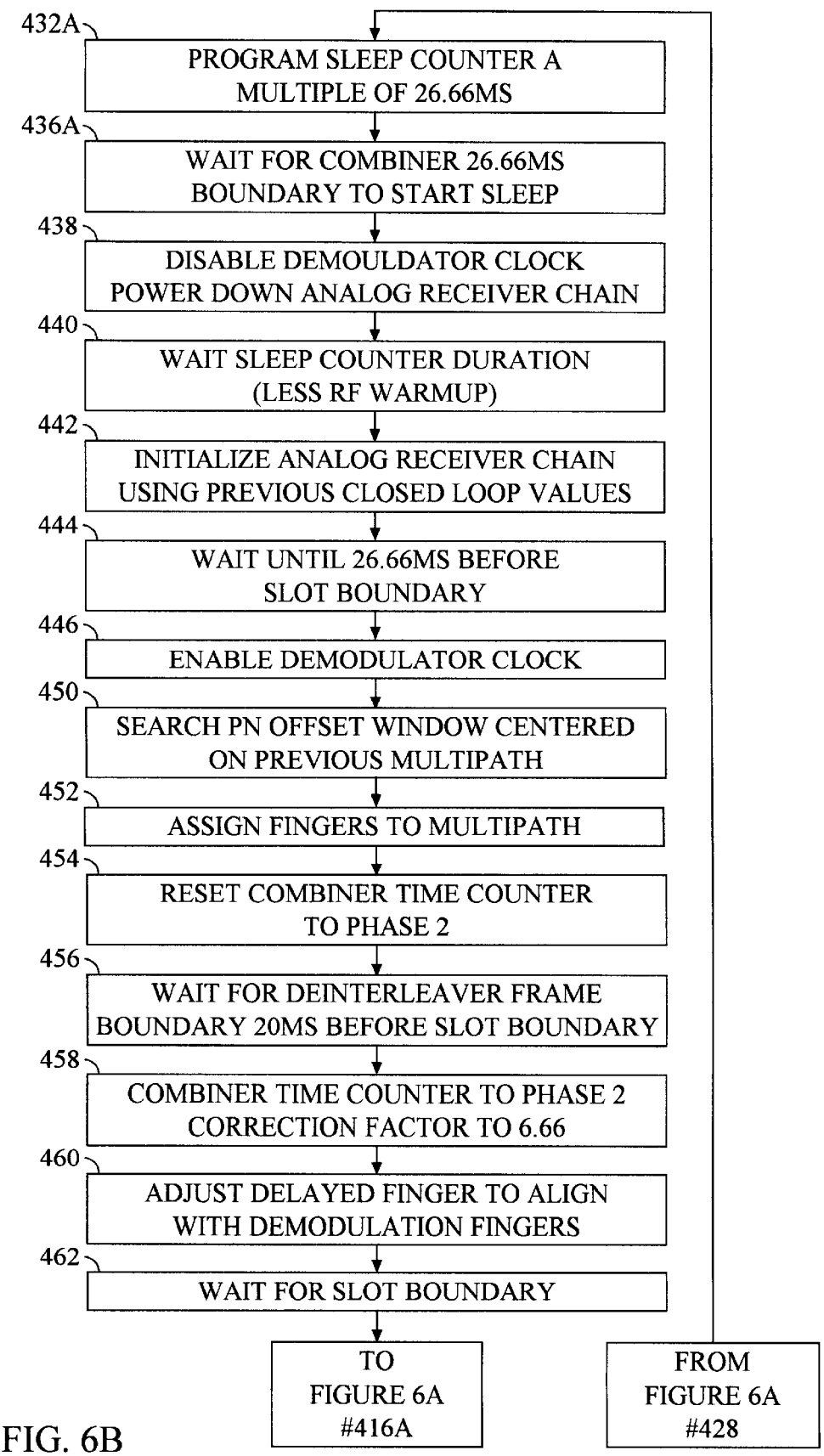

FIG. 6 is a flow chart illustrating aspects of the invention which compensate for incorrect combiner time counter values. The process represented in FIG. 6 can be implemented in the remote unit depicted in FIG. 3 under the control of software or firmware, for example running on the controller. The process begins at block 400 when the remote unit is powered on. From block 400 flow continues to block 402 where the analog receiver chain is initialized. From block 402 flow continues to block 404, where the searcher searches all the possible PN offsets. Flow then continues to block 406 and fingers are assigned to the best multipath signals located by the searcher. Flow then continues to block 408 where the remote unit begins to decode the sync channel. From block 408 flow continues to block 410 where the combiner timer count is reset using the finger tracking the earliest multipath. In block 414, one finger is delayed 6.66 ms from those used in demodulation. This finger will not be used for demodulation. Flow continues to block 416.

In block 416, decoding of the paging message begins. Flow continues to block 428, where it is determined if there are any additional page messages. If yes, flow continues to block 416 and the paging message is decoded. If no, flow continues to block 432a.

In block 432a, the sleep counter is programmed to a multiple of 26.66 ms. Flow continues to block 436a and where the remote unit waits for the combiner 26.66 ms boundary and then starts sleep. In block 438, the remote unit disables the demodulator clock, and powers down the analog receiver chain. Flow continues to block 440 when the remote unit waits for the sleep counter duration, less the RF warmup time. Flow then continues to block 442 where the analog receiver channel is initialized. In block 444, the remote unit waits until 26.66 ms before the slot boundary. In block 446, the demodulator clock is enabled. As represented by block 450, the PN offset window centered on the previous multipath is searched. Next, at block 452, fingers are assigned to multipaths. Flow then continues to block 454 where the combiner time counter is reset, forcing the counter into phase 2 and set the combiner offset correction factor to 6.66 ms. In block 456 the remote unit waits for a deinterleaver frame boundary 20 ms before slot boundary, when the combiner time counter is reset to zero. Next in block 458, the controller forces the combiner time counter back to phase 2, and sets the combiner offset correction factor to 6.66 ms. In block 460, the delayed finger is adjusted to align its timing with the demodulation fingers. As represented by block 462, the remote unit waits in the slot boundary and then flow continues to block 416 when the paging message is decoded and the subsequent steps outlined above are followed.

In the embodiment described above, one of a plurality of fingers was used to reinitialize the combiner time counter. In other embodiments different methods of adjusting the combiner time reference may be used, such as, for example, direct overwrite of the combiner time reference with a delayed count, while still remaining within the spirit and scope of this invention.

More information concerning the searching process, demodulating element assignment and search engines can be found in:

(1) U.S. Pat. No. 5,644,591, entitled METHOD AND APPARATUS FOR PERFORMING SEARCH ACQUISITION IN A CDMA COMMUNICATIONS SYSTEM;

(2) U.S. Pat. No. 5,805,648, entitled METHOD AND APPARATUS FOR PERFORMING SEARCH ACQUISITION IN A CDMA COMMUNICATIONS SYSTEM;

(3) U.S. Pat. No. 5,867,527 and 5,710,768, entitled METHOD OF SEARCHING FOR A BURSTY SIGNAL;

(4) U.S. Pat. No. 5,764,687, entitled MOBILE DEMODULATOR ARCHITECTURE FOR A SPREAD SPECTRUM MULTIPLE ACCESS COMMUNICATION SYSTEM;

(5) U.S. Pat. No. 5,577,022, entitled PILOT SIGNAL SEARCHING TECHNIQUE FOR A CELLULAR COMMUNICATIONS SYSTEM;

(6) U.S. Pat. No. 5,654,979, entitled CELL SITE DEMODULATION ARCHITECTURE FOR A SPREAD SPECTRUM MULTIPLE ACCESS COMMUNICATION SYSTEMS;

(7) Application Ser. No. 08/987,172, entitled MULTI CHANNEL DEMODULATOR, filed on Dec. 9, 1997; and (8) Application Number 09/283,010, entitled PROGRAMMABLE MATCHED FILTER SEARCHER, filed on Mar. 31, 1999; each of which is assigned to the assignee hereof and incorporated herein by reference, in its entirety.

The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method, for use in a remote unit which operates in a slotted mode communication system, for providing synchronization after a jump to a new time alignment, comprising:

entering an inactive state, and
deactivating a combiner time counter,
deactivating at least one demodulation finger;
entering an active state after a predetermined time period, 26.66 ms before a slot boundary;
re-activating said combiner time counter;
reactivating said at least one demodulation finger;
adjusting an 80 ms counter to a desired count;
adjusting the combiner time counter to the proper phase;
determining wall clock time with reference to a combiner offset value, said 80 ms counter and said combiner time counter.

2. The method of claim 1, further comprising determining said wall clock time after said slot boundary without reference to said combiner offset value.

3. The method of claim 1 wherein said at least one demodulation finger includes a delayed demodulation finger.

4. The method of claim 1, wherein said inactive state was entered at the end of a PN roll.

5. The method of claim 1, further comprising adjusting the combiner time counter to the proper phase a second time after the combiner time counter resets.

6. The method of claim 1 wherein the 80 ms counter is adjusted to a count which compensates for the length of a preceding inactive state.

7. A method for providing synchronization upon entering an active state after an inactive state while operating in a slotted mode, for use in a remote unit having a combiner time counter, at least one demodulation finger and a frame counter, said method comprising:

entering an active state a predetermined time period before a slot boundary;
re-activating the combiner time counter;
reactivating the at least one demodulation finger;
adjusting the frame counter to a desired count;
adjusting the combiner time counter to the proper phase;
determining wall clock time with reference to a combiner offset value, the frame counter and the combiner time counter.

8. The method of claim 7, wherein said predetermined time period corresponds to one PN roll.

9. The method of claim 7, further comprising determining said wall clock time after said slot boundary without reference to said combiner offset value.

10. The method of claim 7, wherein said at least one demodulation finger includes a delayed demodulation finger.

11. The method of claim 7, wherein said inactive state was entered at the end of a PN roll.

12. The method of claim 7, further comprising adjusting the combiner time counter to the proper phase a second time after the combiner time counter resets.

13. The method of claim 7 wherein the frame counter is adjusted to a count which compensates for the length of a preceding inactive state.

14. A remote unit for use in a wireless communication system comprising:

a demodulation finger delayed 6.66 ms from a demodulation finger tracking a first multipath signal received by said remote unit;
a combiner time counter configured as a modulo 80 counter and synchronized with said delayed demodulation finger;
an 80 ms counter configured to count the number of times said combiner time counter counts through 80 ms;
a controller configured to update said 80 ms counter to a desired count following deactivation and reactivation of said 80 ms counter, forcing said combiner time counter to phase 2 during a period 26.66 ms prior to a slot boundary and calculate a time measurement by summing a value obtained by multiplying said 80 ms counter value by 80 ms with said combiner time counter value and a correction factor.

15. The remote unit of claim 14, wherein said controller is further configured to calculate a time measurement after a slot boundary is reached without reference to said correction factor.

16. The remote unit of claim 14, wherein said inactive state was entered at the end of a PN roll.

17. The remote unit of claim 14, wherein said controller is further configured to adjust the combiner time counter to the proper phase a second time after the combiner time counter resets.

18. The remote unit of claim 14, wherein the controller is further configured to adjust the 80 ms counter to a count which compensates for the length of a preceding. inactive state.

19. A remote unit for use in a wireless communication system comprising:

a demodulation finger delayed 6.66 ms from a demodulation finger tracking a first multipath signal received by said remote unit;
a combiner time counter configured as a modulo 80 counter and synchronized with said delayed demodulation finger;
an 80 ms counter configured to count the number of times said combiner time counter counts through 80 ms;
a controller comprising means for re-activating the combiner time counter, means for reactivating the at least one demodulation finger, means for adjusting the 80 ms counter to a desired count, means for adjusting the combiner time counter to the proper phase, and means for determining wall clock time with reference to a combiner offset value, the 80 ms counter and the combiner time counter.

* * * * *